United States Patent
Rane (10) Patent No.: US 10,644,904 B2
(45) Date of Patent: May 5, 2020

(54) SYSTEM AND METHOD FOR CHANNEL ESTIMATION

(71) Applicant: Sasken Technologies Ltd, Bangalore (IN)

(72) Inventor: Sahil Sitaram Rane, Mumbai (IN)

(73) Assignee: SASKEN TECHNOLOGIES LTD, Karnataka (IN)

( * ) Notice: Subject to any disclaimer, the term of this patent is extended or adjusted under 35 U.S.C. 154(b) by 0 days.

(21) Appl. No.: 16/410,324

(22) Filed: May 13, 2019

(65) Prior Publication Data

US 2019/0379562 A1 Dec. 12, 2019

(30) Foreign Application Priority Data

Jun. 6, 2018 (IN) .............................. 201841021251

(51) Int. Cl.
*H04L 25/02* (2006.01)

(52) U.S. Cl.
CPC ........ *H04L 25/0232* (2013.01); *H04L 25/021* (2013.01); *H04L 25/022* (2013.01); *H04L 25/0212* (2013.01); *H04L 25/0242* (2013.01); *H04L 25/0256* (2013.01)

(58) Field of Classification Search
CPC ............... H04L 25/0232; H04L 25/021; H04L 25/0212; H04L 25/022; H04L 25/0242; H04L 25/0256; H04L 27/2647; H04L 27/2657; H04L 27/2662; H04L 5/0048
See application file for complete search history.

(56) References Cited

U.S. PATENT DOCUMENTS

2009/0103666 A1* 4/2009 Zhao ..................... H04L 25/022
                                                                  375/341
2018/0013592 A1* 1/2018 Liu ....................... H04B 17/391

* cited by examiner

Primary Examiner — Ted M Wang (57) ABSTRACT

A receiver for receiving OFDM signals with a channel estimation means is disclosed. The channel estimation means estimates the channel at pilot locations by least squares estimation at pilot locations in subcarriers that include pilot symbols. Using the estimates of the channel at pilot locations, it estimates the channel for each subcarrier containing the pilot symbols, using linear interpolation. It estimates the channel for the sub-frame by interpolating the channel estimates estimated for the sub-carriers including the pilot locations, by using Minimum Mean Square Estimation that uses an auto-covariance matrix. An auto-covariance matrix generator generates the auto-covariance matrix. It generates an auto-covariance matrix based on, an extended cyclic prefix, an estimate of the channel in the time domain estimated by performing an Inverse Discrete Fourier Transform on the channel estimated as above and an average tap power calculated based on the estimate of the channel in the time domain.

6 Claims, 8 Drawing Sheets

SYSTEM AND METHOD FOR CHANNEL ESTIMATION

TECHNICAL FIELD

The disclosure generally relates to wireless communication systems and more particularly to systems and methods for Minimum Mean Square Estimation (MMSE) based channel estimation in Long Term Evolution (LTE) system. The present application is based on, and claims priority from an Indian application No. 201841021251 filed on Jun. 6, 2018 the disclosure of which is hereby incorporated by reference.

BACKGROUND

Orthogonal Frequency-Division Multiplexing (OFDM) is a prominent multi-carrier transmission technique used in wireless communication. Mostly, wireless channels are frequency selective, thereby leading to rise in inter-symbol interference. OFDM assists in combating inter-symbol interference caused by frequency selective nature of wireless channels and is hence a useful multi carrier technique. In satellite telecommunications, a downlink is the link from a satellite down to one or more ground stations or receivers. Long Term Evolution (LTE) is a standard for high-speed wireless communication for mobile devices and data terminals. OFDM has been adopted as a transmission strategy for downlink in LTE systems since release 8.

In OFDM transmission, modulated data is loaded on to a set of sub-carriers followed by an Inverse Fast Fourier Transform (IFFT) operation on them. After addition of a cyclic prefix, the resultant block of symbols is transmitted over the channel. At the receiver, after removing the cyclic prefix, Fast Fourier Transform (FFT) operation is performed over the symbol block to recover the transmitted symbol. As said earlier, these symbols are affected by the selectivity of the channel, when the signal is transmitted through a channel. To reduce channel effects, equalization is carried out at the receiver side, for all the symbols using an estimate of the channel parameters experienced by the symbols over each of the subcarriers. The process of estimating the channel parameters is referred to as channel estimation. After equalization, the received symbols are recovered using demodulation techniques.

In LTE downlink systems, the number of subcarriers in one OFDM symbol depends on the bandwidth selected. (For example. 1.4 MHz, 5 MHz, 10 MHz, and 20 MHz). Typically, 14 or 12 such OFDM symbols constitute one subframe. The smallest time-frequency unit for downlink transmission is denoted by a resource element (RE). Each RE contains a modulated symbol. To facilitate channel estimation, some of the resource elements are reserved for transmitting pilot symbols that are known at the User Equipment (UE) side or on the receiver side. There are six different reference signal configurations for different transmitting strategies, each with their own unique reference symbol positions across the resource grid. Out of these, Cell Specific Reference Signals (CRS) are present in all the downlink sub-frames for frame structure type 1, that is for a Frequency Division Duplex (FDD) system and are scattered in lattice fashion to cover the entire resource grid across time and frequency. Hence these are vital in estimating the channel.

In practice, wireless channels exhibit selectivity in time as well as frequency domains. This doubly-selective nature of the channel necessitates dynamic estimation of the channel at the receiver side. The receiver systems adopt various techniques to estimate the channel, using reference signals, at the REs are already known. The optimal channel estimator at the receiver systems for such an arrangement is based on 2-D MMSE based interpolation. However, the existing receiver systems implement 1-D estimators due to the complexity of such an estimator. Usually, the channel is estimated at the reference positions using least squares (LS) or MMSE techniques. The channel estimated at the reference positions is then interpolated across time and frequency axes to get an estimate for non-reference positions. Interpolation can be linear or MMSE based, with the latter being superior to the former in terms of performance. However, MMSE based interpolation requires knowledge of the channel statistics, which is not feasible in practice due to the rapid changes in the wireless environment.

Existing receiver systems provide a theoretical method of implementing MMSE based interpolation in frequency domain by calculating the auto covariance matrix of the channel in the frequency domain. Practically, the receiver does not have knowledge of the auto-covariance matrix to perform MMSE based interpolation. An inaccurate or wrong auto auto-covariance matrix, when used for interpolation degrades performance of reception. It is more severe in the case of a highly frequency selective channel. Given the dynamic nature of the channel, the receiver system needs to calculate auto-covariance matrix after every time interval.

SUMMARY

Thus, there exists a need for a receiver system with improved channel estimation in order to solve one or more of the above mentioned problems. There also exists a need for a method for improved channel estimation in order to solve one or more of the above mentioned problems.

A receiver for receiving OFDM signals with a channel estimation means is disclosed. According to some examples of the present disclosure, the receiver for receiving Orthogonal Frequency-Division Multiplexing signals, the receiver including a channel estimation means for estimating a channel by performing least squares estimation of the channel at each pilot location of each subcarrier received that include pilot symbols, within a sub-frame of a received signal, for obtaining an estimate of the channel at each pilot location of that sub-carrier, using the estimates of the channel at the pilot locations, estimating the channel for each subcarrier containing the pilot locations using linear interpolation, estimating the channel for the sub-frame by interpolating the channel estimates estimated for the sub-carriers including the pilot locations, by using Minimum Mean Square Estimation, by using a covariance matrix received from a covariance matrix generator, the covariance matrix generator comprising: a processor and a memory configured for periodically generating a covariance matrix based on, a number equal to an extended cyclic prefix, an estimate of the channel in the time domain estimated by performing an Inverse Discrete Fourier Transform on the channel estimated using Minimum Mean Square Estimation, an average tap power calculated based on the estimate of the channel in the time domain.

According to some aspects of the disclosure is disclosed a method for receiving Orthogonal Frequency-Division Multiplexing signals, the method including a method for channel estimation by performing: estimating the channel by least squares estimation at each pilot location of each received subcarrier that include pilot symbols, within a sub-frame of a received signal, for obtaining an estimate of the channel at each pilot location of that sub-carrier, using the estimates of the channel at the pilot locations, estimating the channel for each subcarrier containing the pilot locations using linear interpolation, estimating the channel for the sub-frame by interpolating the channel estimates estimated for the sub-carriers including the pilot locations, by using Minimum Mean Square Estimation, by using a covariance matrix, the method for generating the covariance matrix comprising generating a covariance matrix based on, a number equal to an extended cyclic prefix, an estimate of the channel in the time domain estimated by performing an Inverse Discrete Fourier Transform on the channel estimated using Minimum Mean Square Estimation, an average tap power calculated based on the estimate of the channel in the time domain.

The summary above is illustrative only and is not intended to be in any way limiting. Further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

Generally, in communication systems, the signal goes through a medium (called channel) and the signal gets distorted or various noise is added to the signal while the signal goes through the channel. It is necessary to properly decode the received signal without much errors and further to remove the distortion and noise applied by the channel from the received signal. To do this, the first step is to figure out the characteristics of the channel that the signal has gone through. The technique/process to characterize the channel is called 'channel estimation'.

Typically, in wireless communication systems, to recover the data, the receiver needs an estimate of channel parameters generally referred to as estimating the channel. In practice, wireless channels exhibit selectivity in the time domain as well as the frequency domain. Because of the doubly-selective nature of the channel, dynamic estimation of the channel is required. Channel estimation is usually achieved by inserting pilot symbols, during transmission, in all subcarriers in a particular OFDM symbol, known as block-type pilot arrangement or inserting them at specific intervals in time and frequency, known as comb-type pilot arrangement. In LTE, both the arrangements have been exploited for different transmission strategies. Embodiments of the present disclosure focus on the comb-type arrangements which is used by cell-specific reference signal in downlink LTE.

The optimal channel estimator for such an arrangement is based on 2D Wiener filter interpolation. However, due to the high complexity of such an estimator, 1-D estimators are used in practice wherein, the channel is estimated at pilot positions spread over different OFDM symbols across time and frequency. For non-pilot positions, wiener filter based interpolation is carried out. There are various methods to estimate channel at the pilot positions. Least Square (LSE), Minimum Mean Square Estimation (MMSE), Single Value Decomposition (SVD) based are a few among them. However, for Wiener filter based interpolation, the knowledge of channel statistics, mainly the auto-covariance matrix of the channel vector is needed at the receiver. This, however, is not possible in practice. Hence, the present disclosure provides a practical means of calculating this auto-covariance matrix without affecting the overall performance of the estimation.

At least one exemplary embodiment is generally directed towards a receiver for receiving OFDM signals. The receiver including a channel estimation means for estimating a channel by performing least squares estimation of the channel at each pilot location of each subcarrier that include pilot symbols, within a sub-frame of a received signal, for obtaining an estimate of the channel at each pilot location of that sub-carrier, using the estimates of the channel at the pilot locations, estimating the channel for each subcarrier containing the pilot locations using linear interpolation, estimating the channel for the sub-frame by interpolating the channel estimates estimated for the sub-carriers including the pilot locations, by using Minimum Mean Square Estimation, by using a covariance matrix received from a covariance matrix generator, the covariance matrix generator includes a processor and a memory configured for periodically generating a covariance matrix based on, a number equal to an extended cyclic prefix, an estimate of the channel in the time domain estimated by performing an Inverse Discrete Fourier Transform on the channel estimated using Minimum Mean Square Estimation, an average tap power calculated based on the estimate of the channel in the time domain. In addition to the illustrative aspects, exemplary embodiments, and features described above, further aspects, exemplary embodiments of the present disclosure will become apparent by reference to the drawings and the following detailed description.

Figure 1:
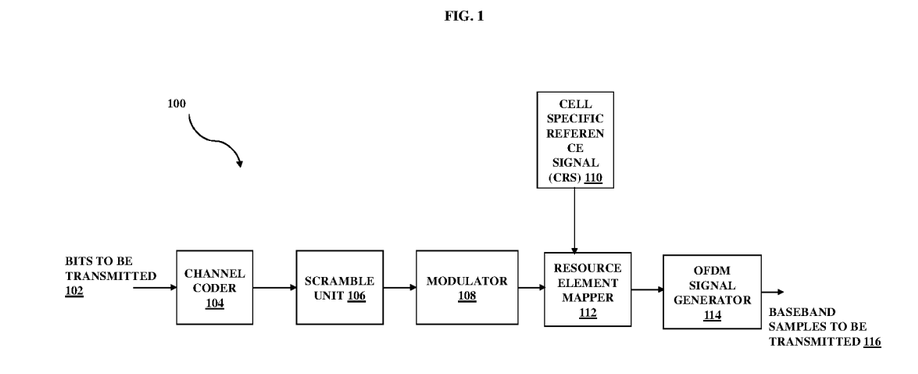
FIG. 1 illustrates a block diagram of a prior art transmitter unit implemented in Long Term Evolution (LTE) systems.

FIG. 1 illustrates a block diagram of a transmitter unit 100 implemented in Long Term Evolution (LTE) systems, according to aspects of the present technique. In particular, the transmitter unit 100 comprises a channel coder 104, a scrambler unit 106, a modulator 108, a resource element mapper 112, and an OFDM signal generator 114. Further, bits to be transmitted 102, a Cell-Specific Reference Signal (CRS) 110 and baseband samples to be transmitted 116 over a transmission channel are also illustrated in FIG. 1. Each component is described in further detail below.

An LTE transmitter 100 at an eNodeB (E-UTRAN Node B) for single layer transmission is illustrated in FIG. 1. In one example, the eNodeB is an element of an LTE Radio Access Network. For conciseness, eNodeB, also known as Evolved Node B (abbreviated as eNodeB or eNB), is an element in E-UTRA of LTE that is the evolution of the element Node B in UTRA of UMTS. It is the hardware that is connected to the mobile phone network that communicates directly wirelessly with mobile handsets (UEs), like a base transceiver station (BTS) in GSM networks.

Referring to FIG. 1, the bits to be transmitted 102 are first fed to the channel coder 104, which are further scrambled by the scrambler unit 106 and then mapped to appropriate constellation symbols in modulation mapper using the modulator 108. The resource element mapper 112 is then configured to map the modulated symbols on the designated resource elements (RE). The smallest modulation structure in LTE is the Resource Element. In one example, a Resource Element is one 15 kHz subcarrier modulated by one symbol. Resource Elements aggregate into Resource Blocks.

The resource element mapper 112 is also configured to map the Cell-Specific Reference Symbols (CRS) 110 on the same resource grid at positions designated for it. In one example, CRS facilitates channel estimation at the UE (user equipment i.e., receiver). For a single layer transmission, pre-coding is not performed over symbols, hence not shown in the FIG. 1. The symbols then modulate the carriers using OFDM modulator 114 which performs an Inverse Discrete Fourier Transform operation over a block of symbols, followed by adding a cyclic prefix to the block of output symbols. Further, RF processing is performed over the modulated signals to transmit baseband samples (116) over a wireless channel. The manner in which the transmitted signal is received and decoded by a receiver is described in detail below.

Figure 2:
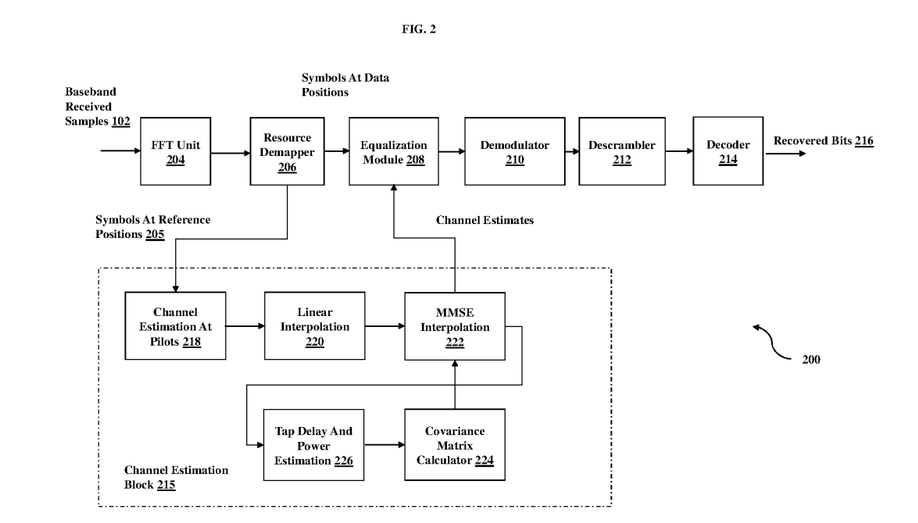
FIG. 2 is a block diagram of one embodiment of a receiver unit implemented in LTE systems, according to an embodiment of the present disclosure.

FIG. 2 is a block diagram of a receiver unit 200 implemented in LTE systems, according to an embodiment of the present disclosure. In particular, the receiver unit 200 comprises a Fast Fourier transform (FFT) unit 204, a resource de-mapper 206, an equalization module 208, a demodulator 210, a de-scrambler 212, and a decoder 214.

In addition, the block 215 within the receiver block diagram 200, illustrates where the channel estimation occurs. Normally, in every communication system, the signal is transmitted through a medium (called channel), and the signal gets distorted and noise is added to the signal while the signal goes through the channel. To properly decode the received signal without much distortion, the errors or the distortion and noise applied by the channel from the received signal is removed. To do this, the first step is to figure out the characteristics of the channel that the signal has gone through. The technique or process for characterizing the channel is called channel estimation. The operation of the channel estimation block 215 is described in detail in the following figures and flow charts.

In particular, the channel estimation block 215 includes channel estimation block at pilots as shown by reference numeral 218, time axis linear interpolation block 220, frequency axis MMSE interpolation block 222, Tap Delay and power estimation block 226 and covariance matrix calculator block 224. The symbols at reference positions 205 from the resource de-mapper block 206 are fed to the channel estimation block 215. Further, the channel estimates obtained by the channel estimation are fed to the equalization module 208.

Particularly, FIG. 2 illustrates the received signal processing chain for User Equipment (UE) of an LTE receiver. The baseband received samples 202 are received from RF processing block at the receiver 200. In one embodiment, from each frame of OFDM, cyclic prefix is removed and Discrete Fourier Transform (DFT) operation (using the FFT unit 204) is performed on the remaining block of symbols. The resource de-mapper 206 extracts the symbols at the reference positions and feeds it to the channel estimation block 215 to estimate the channel effects on the symbols. To remove the channel effect on the data symbols, equalization (using the equalization module 208) is performed. The equalization module 208 takes the symbols to be equalized from de-mapper and estimated channel coefficients from the channel estimation block 215. Equalized symbols are then demodulated using demodulator 210. The demodulated signals are de-scrambled (212) and fed to decoder (214) to recover the transmitted bits.

Figure 3:
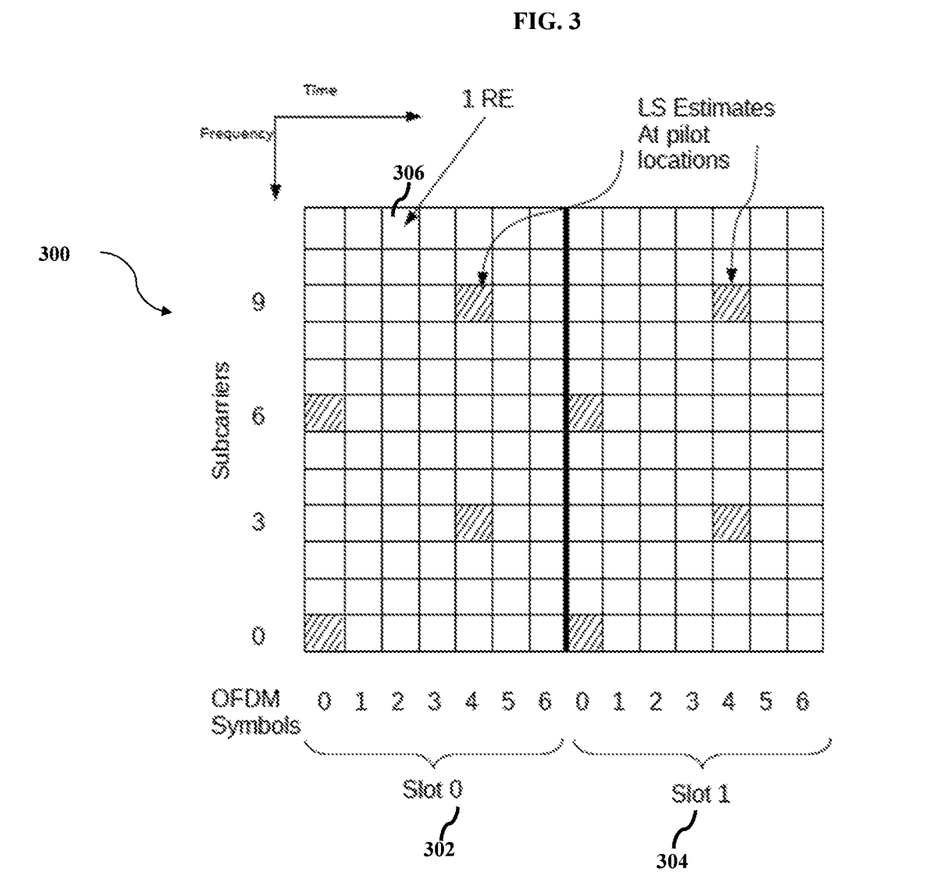
FIG. 3 illustrates an example sub-frame showing a resource grid for downlink transmission for Type-1 Frequency Division Duplex (FDD) frame, according to an embodiment of the present disclosure.

FIG. 3 illustrates an example sub-frame 300 showing a resource grid for downlink transmission for Type-1 Frequency Division Duplex (FDD) frame. The downlink frame of an LTE structure includes the downlink channels and signals. For example, the LTE physical layer has different channels defined on both uplink and downlink, each with a predefined purpose. These physical channels are fed using the transportation channels of higher layers. The physical layer channels are widely divided into data, control and random access channels. Each of these downlink physical channels are mapped onto different places in the LTE frame structure.

The LTE frame is nothing but an imaginary grid of time vs frequency as shown in FIG. 3, where there are placeholders for different channels and signals, for example the downlink control channels are always restricted to first 3 symbols or less, of the sub-frame. The frame structure changes depending on the cyclic prefix type, bandwidth and duplexing modes.

Referring to FIG. 3, each sub-frame includes two slots as shown by reference numeral 302 and 304, each containing seven OFDM symbols for normal cyclic prefix and six OFDM symbols for extended cyclic prefix. The resource element (RE) as shown by reference numeral 306 is the smallest unit in the resource grid and holds a single modulated symbol. Cell-specific Reference Signals (CRS) are at certain positions in a resource grid as shown in the FIG. 3. The positions of CRS shown in the FIG. 3 correspond to the case of a single antenna at eNodeB. In one example, most of the channels (For example, Physical Downlink Shared Channel (PDSCH), Dedicated Physical Control Channel (DPCCH), Physical Broadcast Channel (PBCH), etc.) are used for carrying a special information (a sequence of bits) and they have some higher layer channel connected to them, but Reference Signal is a special signal that exists only at physical layer. This is not for delivering any specific information. The purpose of this Reference Signal is to deliver the reference point for the downlink power. Now using these Cell-specific Reference Signal (CRS), the channel experienced by individual resource elements over all the resource blocks in a given bandwidth is estimated.

The entire channel estimation process is divided into two parts. One part includes estimating the channel at pilots and interpolating the channel at the non-reference positions along the time axis followed by MMSE interpolation along the frequency axis (as explained in FIG. 4). The second part of the channel estimation process deals with the calculation of the auto-covariance matrix of the channel which facilitates the MMSE interpolation (as explained in FIG. 5).

In one embodiment, the present disclosure discloses a receiver for receiving OFDM signals. The receiver includes a channel estimation means for estimating a channel by performing least squares estimation of the channel at each pilot location of each subcarrier that include pilot symbols, within a sub-frame of a received signal, for obtaining an estimate of the channel at each pilot location of that subcarrier, using the estimates of the channel at the pilot locations, estimating the channel for each subcarrier containing the pilot locations using linear interpolation, estimating the channel for the sub-frame by interpolating the channel estimates estimated for the sub-carriers including the pilot locations, by using Minimum Mean Square Estimation, by using a covariance matrix received from a covariance matrix generator. Further the covariance matrix generator includes a processor and a memory configured for periodically generating a covariance matrix based on, a number equal to an extended cyclic prefix, an estimate of the channel in the time domain estimated by performing an Inverse Discrete Fourier Transform on the channel estimated using Minimum Mean Square Estimation, an average tap power calculated based on the estimate of the channel in the time domain.

Further, the periodicity of generation of the covariance matrix is dependent on using the covariance matrix for a predetermined number of sub-frames. In addition, the number of extended cyclic prefix is a predetermined number. The covariance matrix is used to estimate the channel for a predetermined number of subsequent sub-frames after which the covariance matrix is generated again. The covariance matrix is generated after receiving the first sub-frame based on the estimate of the channel in the time domain estimated by performing an Inverse Discrete Fourier Transform on the channel estimated using linear interpolation.

Figure 4:
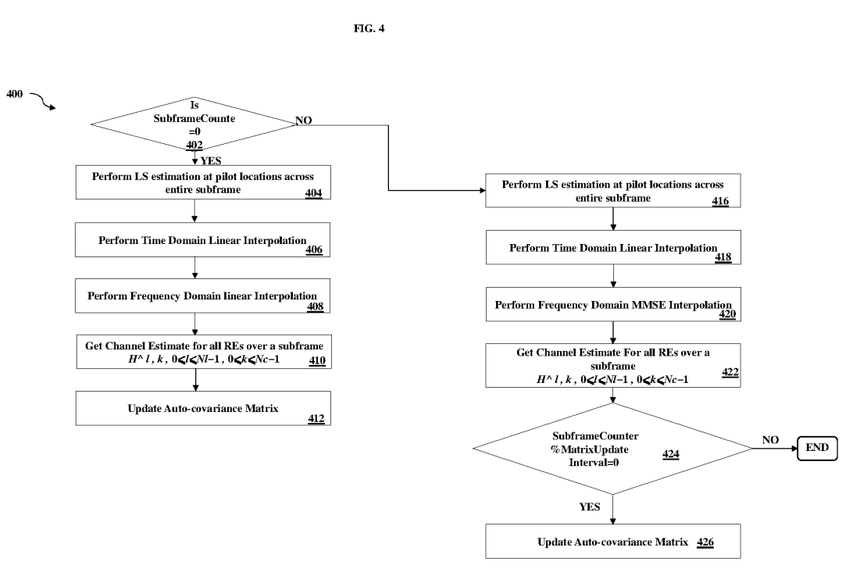
FIG. 4 is a flow chart illustrating a method for estimating a channel at pilots locations and interpolating the channel at the non-reference positions in the time axis followed by MMSE interpolation along the frequency axis, implemented according to aspects of the present disclosure.
Figure 5:
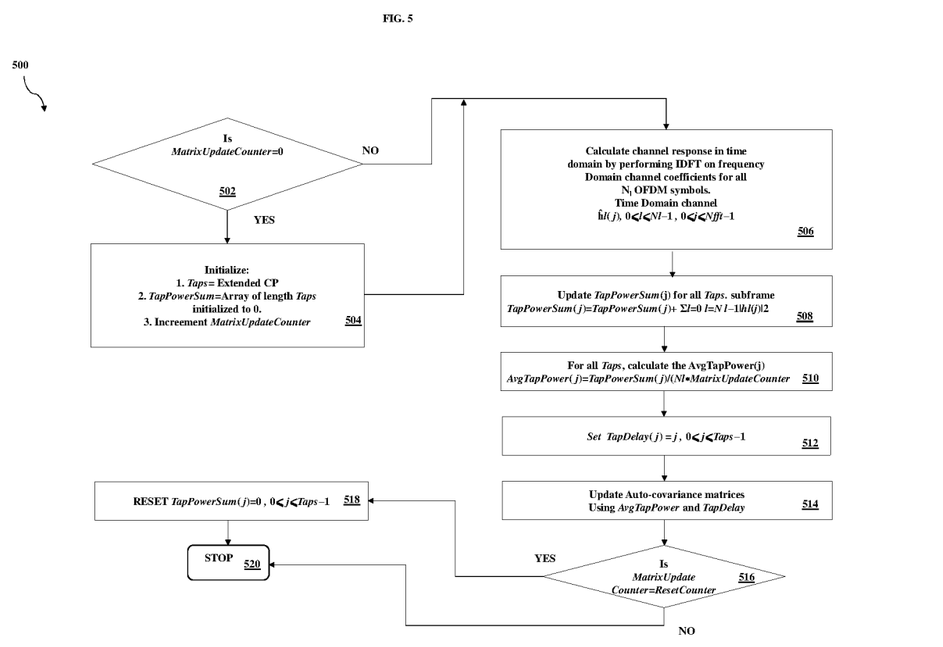
FIG. 5 is a flow chart illustrating a method for of calculating the auto-covariance matrix, implemented according to aspects of the present disclosure.

The overall steps in the channel estimation process are explained in detail further in FIG. 4 and FIG. 5.

FIG. 4 is a flow chart illustrating a method 400 for estimating a channel at pilot locations and interpolating the channel at the non-reference positions in the time domain followed by MMSE interpolation in the frequency domain, implemented according to aspects of the present technique. FIG. 4 may be described from the perspective of a processor that is configured to execute computer-readable instructions to carry out the functionalities of the components of the channel estimation block 215 of FIG. 2.

The steps of the method 400 are initiated based on the status of the sub-frame counter. In one example, it is assumed that MatrixUpdateInterval be a number of sub-frames after which auto-covariance matrix update should happen.

At step 402, the status of the sub-frame counter is checked. When the channel estimation is being done for the first sub-frame of a received signal, i.e., when the sub-counter is zero, then the steps 404 to 412 are executed, else steps 416 to steps 426 are executed. Each step is described in further detail below.

At step 404, least squares estimation is performed at pilot locations, to get estimate of the channel response spread across the entire sub-frame (using below equation). In one example embodiment, the received symbol $Y_{lk}$ at $k^{th}$ sub-carrier of $l^{th}$ OFDM symbol in a sub-frame is expressed as $$Y_{lk}=H_{lk}X_{lk}+W_{lk} \quad (1)$$

where $H_{lk}$ is the channel frequency response at the $k^{th}$ subcarrier and $l^{th}$ OFDM symbol.

$X_{lk}$ is the transmitted symbol at the same RE and $W_{lk}$ is the noise modelled as a Gaussian with zero mean and variance of $\sigma_n^2$. At the pilot location, a pilot symbol $X_{l,p}$ is transmitted and is, a priori, known at the receiver. Using the pilot symbol $Y_{l,p}$ received and the known pilot symbol $X_{l,p}$, the least square (LS) estimate of the channel response $H_{l,p}^{LS}$ is computed as $$H_{l,p}^{LS} = \frac{Y_{l,p}}{X_{l,p}}$$

At step 406, linear interpolation is performed along the time domain using the least squares estimates.

At step 408, frequency domain linear interpolation is performed over the channel estimates obtained after time domain interpolation at frequency locations for every symbol. From step 408, channel estimates for all the subcarriers are obtained (step 410). At step 410, the channel estimates for all REs over a sub-frame is obtained. $\hat{H}_{l,k}$, $0 \leq l \leq Nl-1$, $0 \leq k \leq Nc-1$ At step 412, auto-covariance matrix is updated. Once the auto-covariance matrix is updated, the next steps for the calculation of elements of auto-covariance matrix, are explained in detail in FIG. 5.

The below steps now explain, when the channel estimation is being done for the subsequent sub-frame other than first sub-frame of a received signal, that is, when the sub-counter is not zero, then steps 416 to steps 426 are executed. Each step is described in further detail below.

At step 416, least squares estimation is performed at pilot locations, to get estimate of the channel response spread across the entire sub-frame (using below equation).

In one example embodiment, the received symbol $Y_{l,k}$ at kth subcarrier of lth OFDM symbol in a sub-frame is expressed as $$Yl,k = Hl,k Xl,k + Wl,k \quad (1)$$

where $H_{l,k}$ is the channel frequency response at the kth subcarrier and lth OFDM symbol. $X_{l,k}$ is the transmitted symbol at the same RE and $W_{l,k}$ is the noise modelled as a Gaussian with zero mean and variance of $\sigma_n^2$.

At the pilot location, a pilot symbol $X_{l,p}$ is transmitted and is, a priori, known at the receiver. Using the pilot symbol $Y_l$, preceived and the known pilot symbol $X_{l,p}$, the least square (LS) estimate of the channel response $H_{l,p}^{LS}$ is computed as, $$H_{l,p}^{LS} = \frac{Y_{l,p}}{X_{l,p}}$$

At step 418, linear interpolation is performed along the time domain using the least squares estimates. At step 420, frequency domain MMSE interpolation is performed over the channel estimates obtained after time domain interpolation at frequency locations for every symbol. From step 420, channel estimates for all the subcarriers are obtained (step 422). At step 422, the channel estimates for all Res over a sub-frame is obtained. $\hat{H}$l, k, $0 \leq l \leq Nl-1$, $0 \leq k \leq Nc-1$.

At step 424, when current sub-frame is a multiple of MatrixUpdateCounter then the next steps for the calculation of elements of auto-covariance matrix are executed which are explained in detail in FIG. 5. At step 424, when current sub-frame is not a multiple of MatrixUpdateCounter then the process is stopped.

The disclosed method of calculating the channel auto-covariance matrix is explained in detail below in FIG. 5.

FIG. 5 is a flow chart illustrating a method 500 for of calculating the channel auto-covariance matrix, implemented according to aspects of the present technique. FIG. 5 may be described from the perspective of a processor that is configured to execute computer-readable instructions to carry out the functionalities of the components of the channel estimation block 215 of FIG. 2.

At step 502, the status of the MatrixUpdateCounter is checked. When the MatrixUpdateCounter is zero, then the steps 504 is executed followed by the execution of steps 506 to 520. When the MatrixUpdateCounter is not zero, then the steps 506 to 520 are executed. Each step is described in further detail below.

In particular, for the calculation of elements of auto-covariance matrix, there are two unknowns, number of significant taps and average power for each of these taps. The number of significant taps is assumed to be equal to the extended cyclic prefix defined by LTE (as shown in block 504). The sum of the tap power is maintained for every tap, for all previous sub-frames where the auto-covariance matrix is updated, in a memory (as shown in block 504). In addition, a counter is also maintained to count number of times auto-covariance matrix has been updated. If this is the first sub-frame, then these values are set to zero.

Using the steps of the method 400 as mentioned in FIG. 4, the frequency domain channel estimates are obtained for all $N_l$ OFDM symbols in a sub-frame. The $N_{fft}$ point Inverse Discrete Fourier Transform operation is performed on these channel estimates experienced by each of the $N_l$ OFDM symbols to get the channel estimate in time domain at $N_l$ different time instants (as shown in block 506). For every OFDM symbol, out of the $N_{fft}$ number of time domain channel estimates, consider only initial extended cyclic prefix number of estimate as the significant taps.

At step 508, the power of these significant channel taps for all OFDM symbols is calculated. At step 510, the average tap power of $i^{th}$ tap is calculated and power calculated for $i^{th}$ tap is added on all fourteen OFDM symbols. At step 510, the sum of the tap power stored in memory is added for all previous sub-frames for tap i and using the matrix update counter stored in memory, the average tap power for ith tap is calculated. At step 512, the tap delay is set to: TapDelay (j)=j, $0 \leq j \leq Taps-1$.

At step 514, using the average tap power calculated at the step 510, and tap delay calculated at step 512, the auto-correlation matrices $R_{\bar{H}_{l,p_c}\bar{H}_{l,p_c}}$. $R_{\bar{H}_{l,p_c}\bar{H}_{l,p_c}}$ is updated. Once average power for all the significant taps is calculated, feed those values in below equation, to calculate elements of auto-covariance matrix. $R_{\bar{H}_{l,p_c}\bar{H}_{l,p_c}}$ of size $2N_p \times 2N_p$ is the auto correlation matrix of the vector $\bar{H}_{l,p_c}$ and is expressed as:

$$R_{\bar{H}_{l,p_c}\bar{H}_{l,p_c}} = E[H_{l,p_c} H_{l,p_c}^H]$$

At step 516, the MatixUpdateCounter is checked. If MatixUpdateCounter is equal to the ResetCounter, then TapPowerSum (j) is made zero (that is, Reset as shown in step 518). The new sum of tap power for individual taps is updated in memory. Increment the matrix update counter. If MatixUpdateCounter is not equal to the ResetCounter, then the process 500 is halted (step 520).

The subsequent paragraphs illustrates or explains the channel estimation using LS Estimation and MMSE interpolation in a mathematical way. In one example, let the received symbol $Y_{k,l}$ (referred as equation 1) at $k^{th}$ subcarrier of lth OFDM symbol in a sub-frame is expressed as $H_{l,k}X_{l,k}+W_{l,k}$ (referred as equation 2) where $H_{l,k}$ (referred as equation 3) is the channel frequency response at the kth subcarrier and lth OFDM symbol. In one example, the $X_{l,k}$ (referred as equation 4) is the transmitted symbol at the same RE and $W_{l,k}$ (referred as equation 5) is the noise modelled as a Gaussian with zero mean and variance of $\sigma_n^2$.

At the pilot location, a pilot symbol $X_{l,p}$ is transmitted and is, a priori, known at the receiver. Using the pilot symbol $Y_{l,p}$ received and the known pilot symbol $X_{l,p}$, the least square (LS) estimate of the channel response "$H_{l,p}^{LS}$" is computed as, $$H_{l,p}^{LS} = \frac{Y_{l,p}}{X_{l,p}} \quad (6)$$

Figure 6:
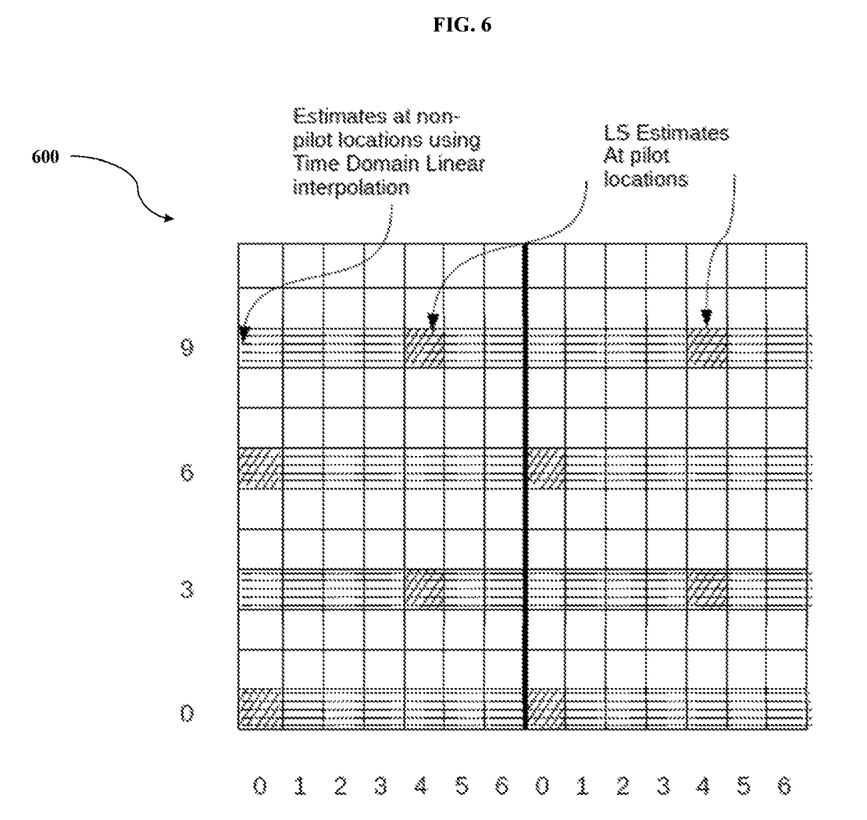
FIG. 6 illustrates an example sub-frame showing estimates at non-pilot locations using linear interpolation along the time axis, according to an embodiment of the present disclosure.
Figure 7:
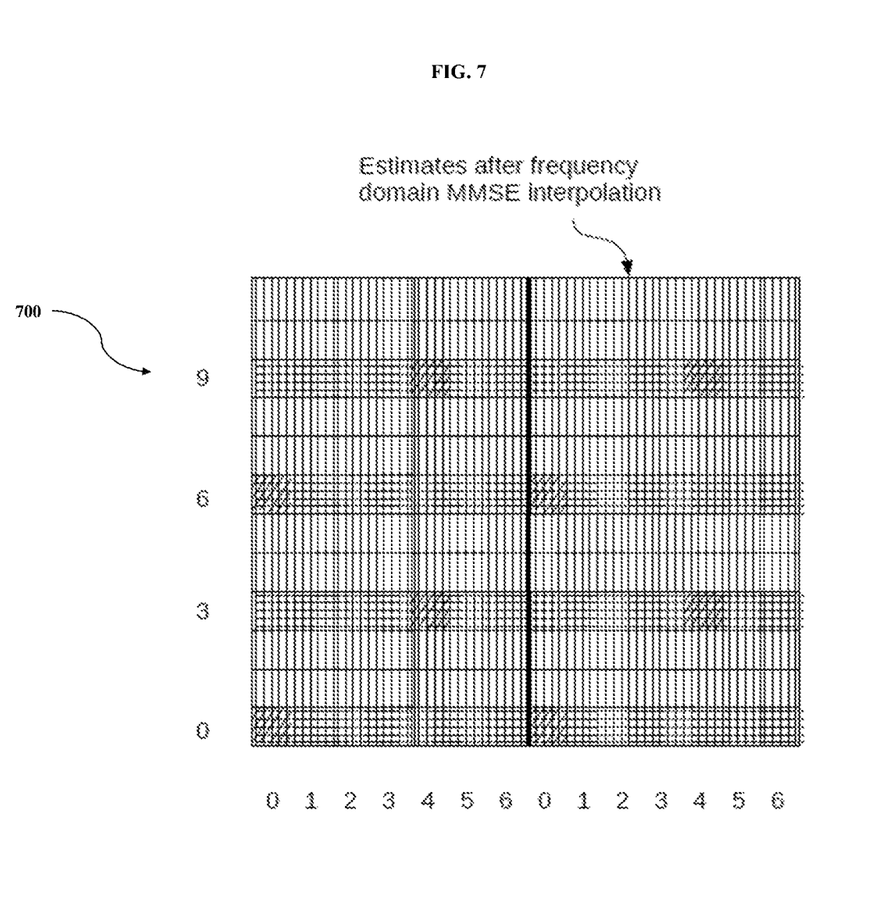
FIG. 7 illustrates an example sub-frame showing estimates after MMSE interpolation along the frequency axis, according to an embodiment of the present disclosure.
Figure 8:
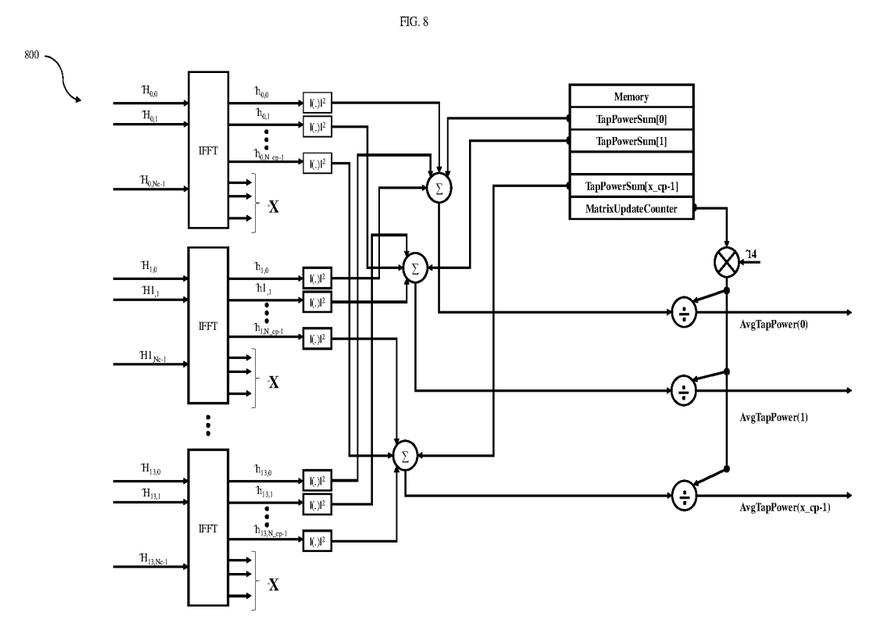
FIG. 8 illustrates, symbolically, the calculation of tap power, according to an embodiment of the present disclosure.
Figure 9:
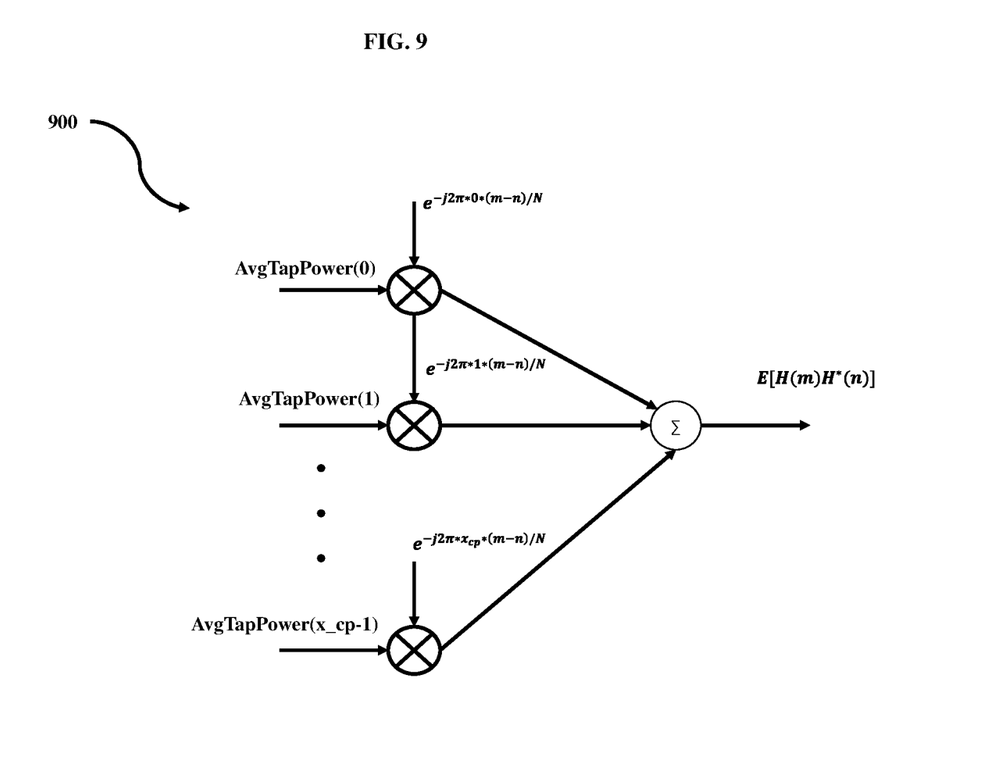
FIG. 9 illustrates symbolically, the calculation auto-covariance matrix, according to an embodiment of the present disclosure.

Such LS estimates of the channel are obtained at the pilot locations as shown in FIG. 6.

Let Nc denote the total number of subcarriers in a given bandwidth and NI be the number of OFDM symbols in a sub-frame. The following assumption of CRS positions is specific to a single antenna system for the ease of explanation. The algorithm is similarly applicable even for CRS in Multi-Antenna systems. Let kp1 denote the first set of positions of pilot subcarriers in OFDM symbols belonging to the set $l_{p1}$. Let $k_{p2}$ denotes second set of positions of pilot subcarriers in OFDM symbols belonging to the set $l_{p2}$. Each set $k_{p1}$ and $k_{p2}$ contains $N_p$ number of pilots. For a single antenna system, these sets are:

kp1={0, 6, 12, . . . }, lp1={0, 7} and $k_{p2}$={3, 9, 15}, $l_{p2}$={4, 11}

In the initial step of the algorithm we calculate the LS estimate of channel response at pilot locations kp1 and kp2 as shown in FIG. 6. This is followed by linear interpolation along the time domain over the set of subcarriers belonging to the set of kp1 and kp2. Let kpc denotes the new combined set of pilot positions across all the OFDM symbols. This results in total of 2Npnumber of pilots in all the OFDM symbols as shown in FIG. 6. Now next step is to estimate channel at the rest of the subcarriers over the frequency domain. MMSE based interpolation over the frequency domain has been found to be better as compared to other interpolation techniques. Over any OFDM symbol l, the final vector of MMSE estimates over all $N_c$ subcarriers is given as:

$$\hat{H}_l^{MMSE} = R_{\bar{H}_l \bar{H}_{p_c,l}} \left( R_{\bar{H}_{p_c,l} \bar{H}_{p_c,l}} + \frac{\sigma_n^2}{P_s} I \right)^{-1} \hat{H}_l^{LS} \quad (7)$$

where $\sigma_n^2$ is the noise power and Ps is the pilot power.
$H_l=[H_{l,0}, H_{l,1}, \ldots H_{l,N_c}]^T$ is the channel frequency response vector of size $N_c \times 1$ of the lth OFDM symbol in a grid. (referred to as equation 8)
Further, $H_l=[H_{l,0},H_{l,3},H_{l,6},H_{l,9},H_{l,12},H_{l,15}\ldots]^T$ is a vector containing the channel experienced at the subcarriers belonging to the set $K_{pc}$. $H_{LS}$ contains the channel estimates at the combined pilot positions obtained after LS estimation at pilots followed by time domain interpolation. It is of size $2N_p \times 1$.

$R_{\bar{H}_{l,p_c} \bar{H}_{l,p_c}}$ (referred to as equation 9) of size $2N_p \times 2N_p$ is the auto correlation matrix of the vector $\bar{H}_{l,p_c}$ (referred to as equation 10) and is expressed as:

$$R_{\bar{H}_{p_c,l} \bar{H}_{p_c,l}} = E[\bar{H}_{p_c,l} \bar{H}_{p_c,l}^H]$$

(referred as equation 11). Similarly, a correlation matrix between a vector containing channel coefficients over all the frequencies for a symbol l, is represented as:

$$R_{\bar{H}_l \bar{H}_{pc,l}} = E[\bar{H}_l \bar{H}_{pc,l}^H]. \quad (12)$$

It is of size $N_c \times 2N_p$.

Now, in general, it is assumed that the receiver has knowledge of these covariance matrices. Or else, some implementations assumed the power delay profile to be uniform. However, incorrect knowledge of these matrices degrades the performance of MMSE; especially when the channel is highly frequency selective.

The subsequent paragraphs illustrates or explains method of calculation of the channel auto-covariance matrix:

Now, the impulse response for a time invariant multipath fading channel is expressed as:

$$h[\tau] = \sum_h a_i \delta(\tau - \tau_i) \quad (4)$$

where $\alpha_i$ is the power of the ith path arriving with a delay of $\tau_i$. Multiple copies of the signal arrive at the receiver with different delays. At the receiver, however, since the received signal is sampled at $t=T_s$, only the signals contributing to the sampling time instants are considered. This gives rise to the tap-delay line model of the channel expressed as:

$$h[\tau] = \sum_{l=0}^{L-1} a_l \delta(\tau - \tau_l) \quad (5)$$

where L is the number of significant taps, $\alpha_l$ is the total power contribution of the multi-paths contributing to tap l. By taking the Fourier transform, the frequency response of the channel can be expressed as:

$$H[f] = \sum_{l=0}^{L-1} a_l e^{-j2\pi f \tau_l} \quad (6)$$

Because of the sampling instants, $\tau_l$ is considered as the multiple of the sampling time $T_s$ as. $\tau_l=lT_s$ Moreover, in OFDM we consider channel coefficients at the discrete frequencies i.e., subcarriers, $f=k\Delta f$ $$H[k\Delta f] = \sum_{l=0}^{L-1} a_l e^{-j2\pi f \tau_l} \quad (7)$$

Further simplifying the above equation by the relation $$T_s = \frac{1}{N_{fft}\Delta f}$$

where $N_{fft}$ is the FFT length, we get:

$$H[k] = \sum_{l=0}^{L-1} a_l e^{\frac{-j2\pi f k_l}{N_{fft}}} \quad (8)$$

This expresses the channel coefficient at the kth subcarrier. Using this relationship, the correlation between channel coefficients at two different frequencies 'm' and 'n' are expressed as:

$$E[H(m)H^*(n)] = \sum_{l=0}^{L-1} E[|\alpha_l|^2] e^{\frac{-j2\pi l(m-n)}{N}}. \quad (9)$$

The assumption made here is, channel is Wide-Sense Stationary Uncorrelated Scattering (WSSUS). Hence, different taps are independent of each other. $E[|\alpha_l|_2]$ indicates the average power of the lth tap. Now, auto-correlation matrix of the channel vector $\tilde{H}=[H_0, H_1, \ldots H_{N-1}]^T$ is expressed as $$R_{\tilde{H}\tilde{H}} = E[\tilde{H}\tilde{H}^H] \quad (10)$$

$$= \left[ \begin{bmatrix} H_0 \\ H_1 \\ \vdots \\ H_{N-1} \end{bmatrix} [H_0^* \quad H_1^* \quad \ldots \quad H_{N-1}^*] \right]$$

$$= \left[ \begin{bmatrix} E[H_0 H_0^*] & E[H_0 H_1^*] & \ldots & E[H_0 H_{N-1}^*] \\ E[H_1 H_0^*] & E[H_1 H_1^*] & \ldots & E[H_1 H_{N-1}^*] \\ \vdots & \vdots & \ddots & \vdots \\ E[H_{N-1} H_0^*] & E[H_{N-1} H_1^*] & \ldots & E[H_{N-1} H_{N-1}^*] \end{bmatrix} \right] i$$

Now using the earlier relationships, matrix $R_{\tilde{H}\tilde{H}}$ can be computed provided we have knowledge of the number of taps, corresponding delay and power. Since, this knowledge is not While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A receiver for receiving Orthogonal Frequency-Division Multiplexing signals, the receiver including a channel estimation means for estimating a channel by performing least squares estimation of the channel at each pilot location of each subcarrier received that include pilot symbols, within a sub-frame of a received signal, for obtaining an estimate of the channel at each pilot location of that sub-carrier, using the estimates of the channel at the pilot locations, estimating the channel for each subcarrier containing the pilot locations using linear interpolation, estimating the channel for the sub-frame by interpolating the channel estimates estimated for the sub-carriers including the pilot locations, by using Minimum Mean Square Estimation, by using a covariance matrix received from a covariance matrix generator, the covariance matrix generator comprising:

a processor and a memory configured for periodically generating a covariance matrix based on, a number equal to an extended cyclic prefix, an estimate of the channel in the time domain estimated by performing an Inverse Discrete Fourier Transform on the channel estimated using Minimum Mean Square Estimation, an average tap power calculated based on the estimate of the channel in the time domain.

2. The receiver of claim 1, wherein the periodicity of generation of the covariance matrix is dependent on using a covariance matrix for a predetermined number of sub-frames.

3. The receiver of claim 1, wherein the number of extended cyclic prefix is a predetermined number.

4. The receiver of claim 1, wherein the covariance matrix is used to estimate the channel for a predetermined number of subsequent sub-frames after which the covariance matrix is generated again.

5. The receiver of claim 1, wherein, the covariance matrix generated after receiving the first sub-frame based on the estimate of the channel in the time domain estimated by performing an Inverse Discrete Fourier Transform on the channel estimated using linear interpolation.

6. A method for receiving Orthogonal Frequency-Division Multiplexing signals, the method including a method for channel estimation by performing:

estimating the channel by least squares estimation at each pilot location of each received subcarrier that include pilot symbols, within a sub-frame of a received signal, for obtaining an estimate of the channel at each pilot location of that sub-carrier, using the estimates of the channel at the pilot locations, estimating the channel for each subcarrier containing the pilot locations using linear interpolation, estimating the channel for the sub-frame by interpolating the channel estimates estimated for the sub-carriers including the pilot locations, by using Minimum Mean Square Estimation, by using a covariance matrix, the method for generating the covariance matrix comprising:

generating a covariance matrix based on, a number equal to an extended cyclic prefix, an estimate of the channel in the time domain estimated by performing an Inverse Discrete Fourier Transform on the channel estimated using Minimum Mean Square Estimation, an average tap power calculated based on the estimate of the channel in the time domain.

* * * * *